April 20, 1926.

J. A. PETNEL

AUTOMOBILE SIGNAL

Filed March 7, 1924

Inventor
Joseph A. Petnel
By
Frank C. Curtis
Attorney

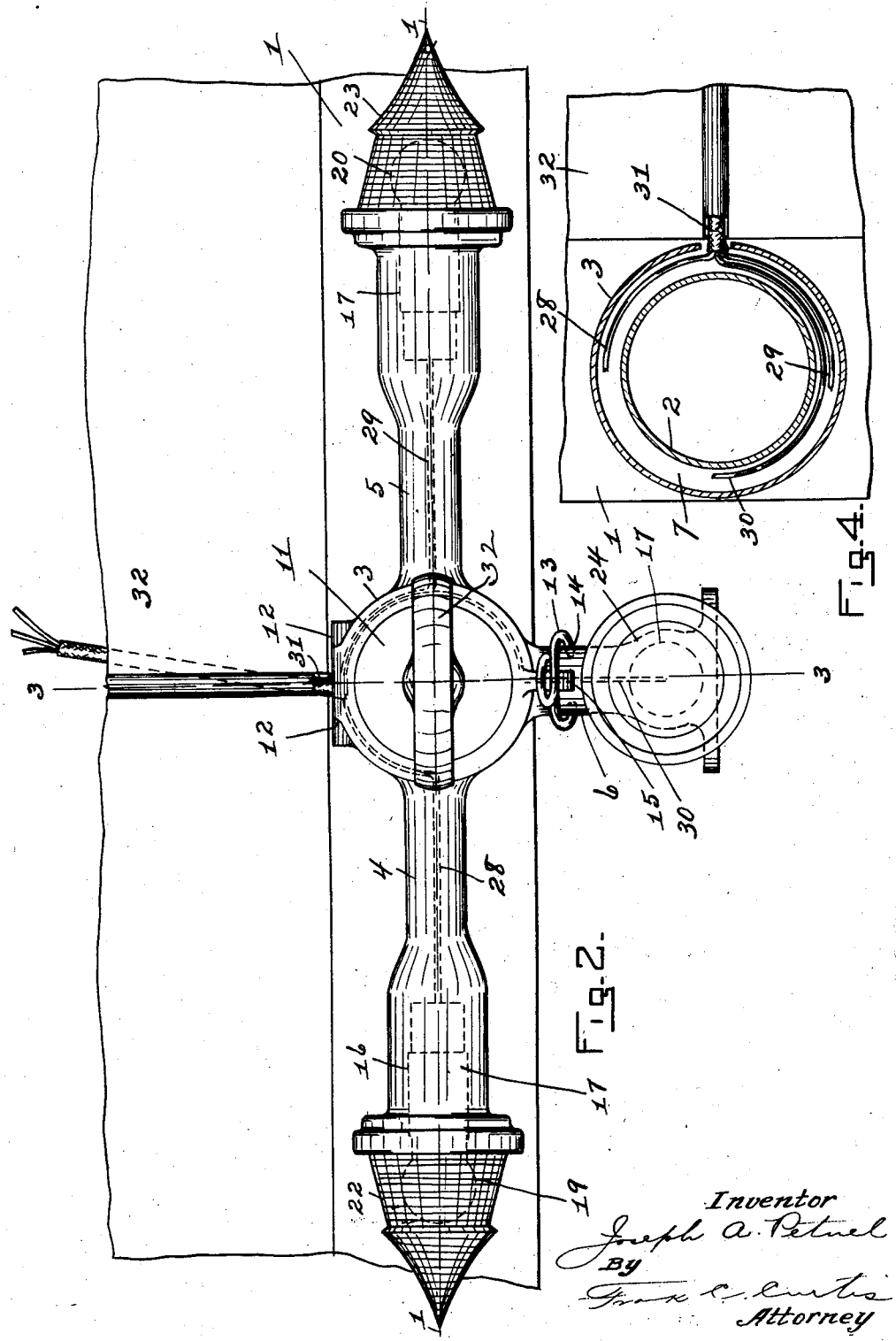

April 20, 1926.
J. A. PETNEL
1,581,226
AUTOMOBILE SIGNAL
Filed March 7, 1924
3 Sheets-Sheet 3
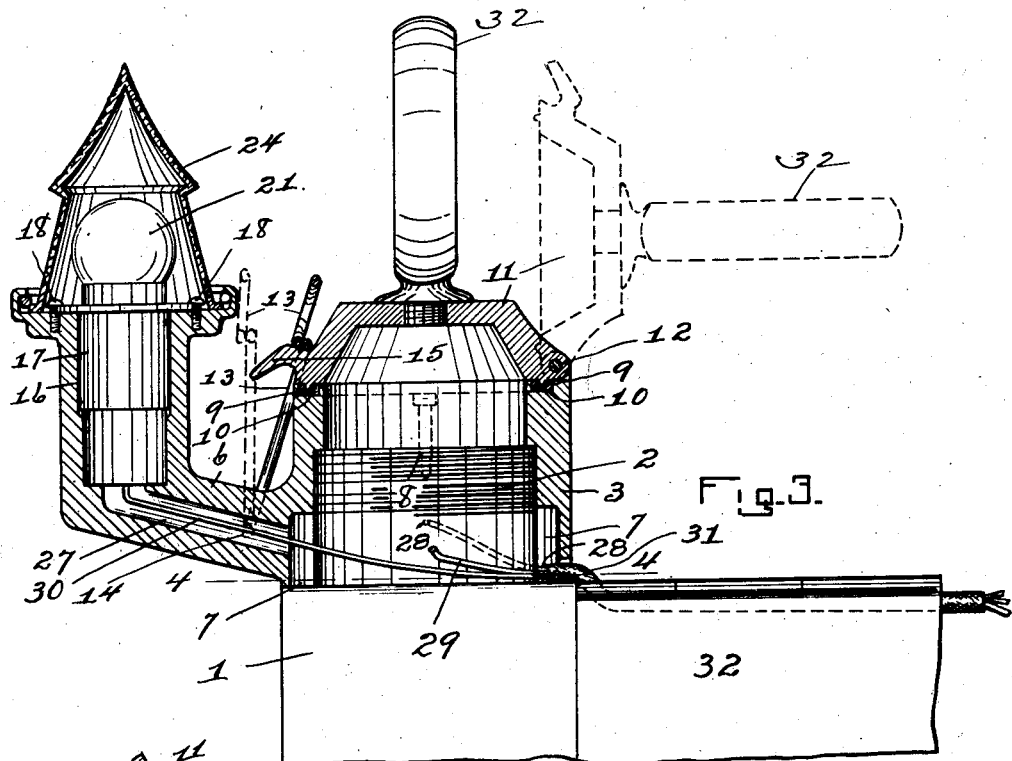
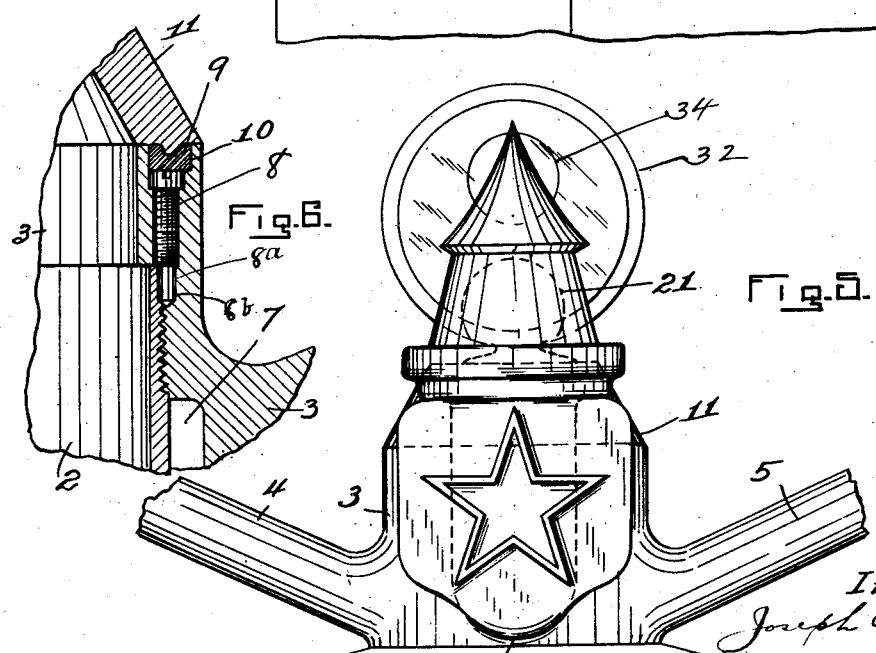
Inventor
Joseph A. Petnel
By
Frank C. Curtis
Attorney Patented Apr. 20, 1926.

1,581,226

UNITED STATES PATENT OFFICE.

JOSEPH A. PETNEL, OF TROY, NEW YORK.

AUTOMOBILE SIGNAL.

Application filed March 7, 1924. Serial No. 697,569.

*To all whom it may concern:*

Be it known that I, JOSEPH A. PETNEL, a citizen of the United States, residing at Troy, in the county of Rensselaer and State of New York, have invented new and useful Improvements in Automobile Signals, of which the following is a specification.

Reference may be had to the accompanying drawings, and the reference characters marked thereon, which form a part of this specification. Similar characters refer to similar parts in the several figures therein.

This invention relates to signal lamps for automobiles.

The principal object of the invention is to provide an attachment for automobiles whereby signal lamps may be supported in a conspicuous position at the front of the vehicle.

Other objects will appear in connection with the following description.

Fig. 1 of the drawings is a view in front elevation of a broken-away portion of an automobile radiator, showing partly in elevation and partly in vertical section a lamp-bracket mounted thereupon in accordance with my invention.

Fig. 2 is a top plan view of the same.

Fig. 3 is a vertical section of the same taken on the broken line 3—3 in Fig. 2, the broken-away portion of the radiator being shown in side elevation.

Fig. 4 is a horizontal cross-section taken on the broken line 4—4 in Fig. 3, through the hub of the lamp-bracket and the nipple of the radiator.

Fig. 5 is a view in front elevation of a broken-away portion of the radiator of an automobile provided with a lamp-bracket in accordance with my invention.

Fig. 6 is a sectional view on an enlarged scale similar to Fig. 1, showing the manner in which the lamp-bracket is locked upon the radiator nipple.

Figure 1:
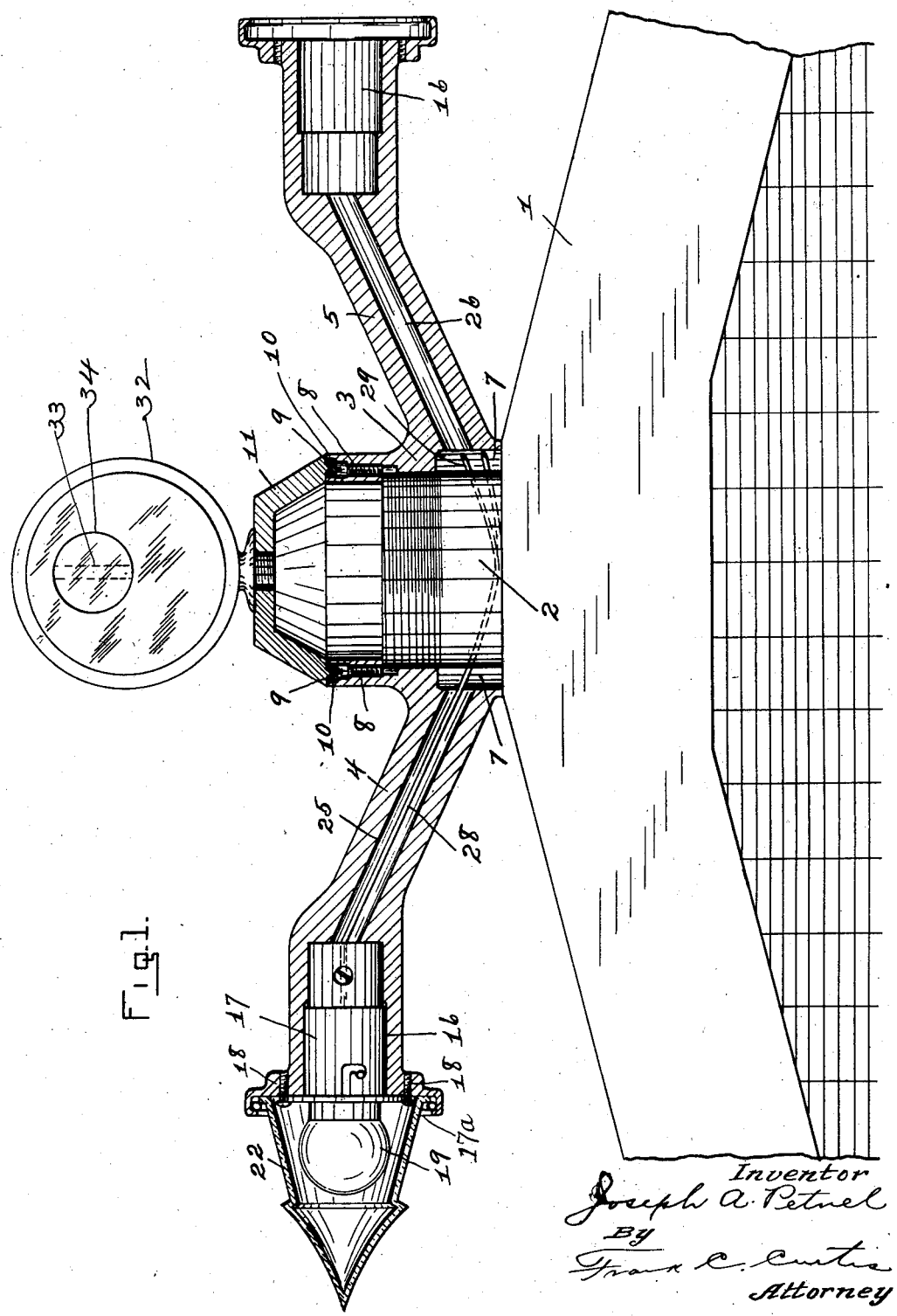

Referring to the drawings wherein the invention is shown in preferred form, 1 is the radiator of an automobile having the usual nipple, 2, through which the radiator can be filled.

In carrying out my invention, I apply to the nipple, 2, in place of the ordinary removable cap, not shown, a lamp-bracket, comprising an open hub, 3, having three laterally projecting arms, 4, 5 and 6, for supporting the signal lamps.

The opening in the hub, 3, is of smaller diameter at its outer end than at its inner end, leaving an annular space, 7, between the inner end of the hub and the base of the nipple, 2.

The portion of the hub of smaller diameter is screw-threaded to fit the screw-threaded end of the nipple, 2, permitting the lamp-bracket to be screwed upon the nipple, in place of the ordinary radiator cap, not shown.

The lamp-bracket is locked upon the radiator nipple, 2, by means of a screw, 8, inserted through a screw-threaded opening in the wall of the hub, 3, into engagement with the nipple, 2.

An opening, $8^a$, is extended from the bottom of the threaded opening for the screw, 8, intersecting the intermeshing threads on the radiator nipple, 2, and hub, 3, and the screw has a plain tip, $8^b$, engageable with the opening, $8^a$, to prevent relative rotation of the hub and nipple.

If desired, two screws, 8, may be employed as shown in Fig. 1.

A gasket or packing-ring, 9, is seated in an annular groove, 10, in the outer end of the hub, 3, surrounding the hub opening in position to be engaged by a cap, 11, hinged at 12, upon the hub, 3, and adapted to be swung to and fro between the closed position shown by solid lines in Fig. 3, and the position indicated by dotted lines in said figure.

A spring-catch, 13, pivoted at 14, upon the hub, 3, or the extension thereof forming the arm, 6, is movable into and out of locking engagement with a lug, 15, on the swinging end of the cap, 11.

The cap, 11, thus serves as a movable closure for the inlet to the radiator.

The cap, 11, may be movably mounted on the hub, 3, in any known manner.

The opening for the screw, 8, is preferably formed through the bottom of the annular groove, 10, so that the head of the screw is covered and concealed by the gasket, 9.

Each of the arms, 4, 5 and 6, is formed at its outer end with a lamp-socket-receiving opening, 16, adapted to receive an incandescent electric lamp socket, 17, which may be secured within the socket-opening in any known manner, as by means of screws, 18, inserted through apertures in a flange, 17ª, on the outer end of the socket, into the body of the bracket arm.

For certain purposes the bracket arms may be formed or provided with lamp-sockets in any known manner.

An incandescent electric lamp, 19, is adapted to be inserted within the socket, 17, in the arm, 4. A similar lamp, 20, is adapted to be inserted in the socket on the arm, 5, and a similar lamp, 21, is adapted to be inserted on the socket on the arm, 6.

On the outer ends of the respective arms, 4, 5 and 6, are mounted lenses, 22, 23 and 24. These lenses are of hollow conical form and are not designed for directing the light in a definite direction, but are corrugated or roughened or made translucent to diffuse the light emanating from the respective lamps, causing the conical lens to become an illuminated signal visible from the front, rear or either side of the lens; and also visible to the driver of another vehicle attempting to pass from the rear.

The arm, 4, is formed with a wire passageway, 25, leading from the lamp-socket opening in its outer end to the space, 7, between the inner end of the hub and the nipple, 2.

The arm, 5, is formed with a similar wire passageway, 26, and the arm, 6, with a similar pasageway, 27.

Wires, 28, may be led from the lamp-socket on the arm, 4, through the passageway, 25, to the space, 7.

Wires, 29, can be led from the lamp-socket on the arm, 5, through the passageway, 26, to the space, 7; and wires, 30, from the lamp-socket on the arm, 6, can be led through the passageway, 27, to the space, 7.

If one side of the circuit, including the lamps, 19, 20 and 21, is grounded, the wires, 28, 29 and 30, will be single wires. Otherwise they will comprise pairs of wires.

The wires, 28, 29 and 30, are led partly around the space, 7, to the rear of the nipple, 2, whereat they may be combined in a cable, 31, and led beneath the hood, 32, of the vehicle to a switch or switches, not shown, whereby the supply of electric current to the respective lamps may be controlled.

The device is intended for signalling to traffic officers, pedestrians and oncoming and passing vehicles, the intention of the operator of the automobile to proceed straight ahead or to turn to the right or to the left; and this can be accomplished by means of any suitable switch mechanism whereby the lamps, 19, 20 and 21, can be selectively illuminated.

Thus if the operator of the vehicle intends to proceed straight ahead he illuminates the lamp, 21, only. If he intends to turn to the right, he illuminates the lamp, 19, only. If he intends to turn to the left, he illuminates the lamp, 20, only.

The arms 4, 5 and 6, are preferably but not necessarily formed integral with the hub, 3.

By the construction above described, I provide not only a support for the lamps by means of which they are visible from various directions, but I also provide a movable closure for the inlet nipple, 2.

The passageways, 26, and 28, are preferably made straight intersecting one side of the hub along a line extending below the hub on the opposite side, so that said passageways can be formed by a simple drilling operation.

I have shown a temperature indicator, 32, mounted upon the cap, 11, said indicator including a thermometer, 33, visible from front and back of the indicator through openings, 34.

The central front lamp, 21, is supported by the bracket arm, 6, in front of this temperature indicator so that when said lamp is illuminated the reading of the thermometer, 33, can be readily made by the operator of the automobile.

While I have shown my invention in connection with a special structure and as operating in a definite manner, it should be understood that I do not limit my invention thereto, except in so far as it is limited by the scope of the claims annexed hereto.

What I claim as new and desire to secure by Letters Patent is—

1. The combination with the nipple of an automobile radiator, of an open hub encircling and secured upon said nipple with its opening registering with the opening in the nipple, the end of the hub adjacent the body of the radiator being spaced away from the nipple to provide a wire-passageway, said hub having a projecting member with a lamp socket, said member being provided also with a wire-passageway leading from the socket through the hub wall to the said wire-passageway between the hub and the nipple.

2. A lamp-bracket for automobiles including an open hub encircling and secured upon the nipple of the radiator with its opening registering with the opening in the nipple, the end of the hub adjacent the body of the radiator being spaced away from the nipple to provide a wire-passageway, said hub having a projecting member with a lamp-socket, said member being provided also with a wire-passageway leading from the socket through the hub-wall to the said wire-passageway between the hub and the nipple; a movable cap mounted on the hub to close the opening therein; and means on the hub for detachably locking the cap in closed position.

3. A lamp-bracket for automobiles comprising in an integral structure on open hub adapted to encircle and be secured upon the nipple of an automobile radiator, with the end of the hub adjacent the body of the radiator spaced away from the nipple to provide a wire-passageway, and a plurality of members projecting from the hub, each of said members being provided with a lamp- socket and also with a wire-passageway leading from the socket through the hub-wall to the said wire-passageway between the hub and nipple.

In testimony whereof, I have hereunto set my hand this 1st day of March, 1924.

JOSEPH A. PETNEL.